United States Patent [19]
Forbord et al.

[11] Patent Number: 6,008,966
[45] Date of Patent: Dec. 28, 1999

[54] DESICCANT HOUSING FOR A DISC DRIVE

[75] Inventors: Kent J. Forbord, St. Louis Park; Mehdi S. Haidari, Eden Prairie; Stephen P. Le Clair, Burnsville, all of Minn.

[73] Assignee: Seagate Technology, Inc., Scotts Valley, Calif.

[21] Appl. No.: 09/104,529

[22] Filed: Jun. 25, 1998

Related U.S. Application Data

[60] Provisional application No. 60/057,955, Sep. 5, 1997, and provisional application No. 60/063,322, Oct. 27, 1997.

[51] Int. Cl.[6] ......................................... G11B 33/14
[52] U.S. Cl. ................................................ 360/97.03
[58] Field of Search ........................... 360/97.01, 97.02, 360/97.03

[56] References Cited

U.S. PATENT DOCUMENTS

| H1067 | 6/1992 | Eckerd | 360/97.02 |
|---|---|---|---|
| 4,418,369 | 11/1983 | Applequist et al. | 360/97.02 |
| 4,831,475 | 5/1989 | Kakuda et al. | 360/97.03 |
| 5,075,807 | 12/1991 | Inoue et al. | 360/97.02 |
| 5,101,305 | 3/1992 | Ohkita et al. | 360/97.02 |
| 5,307,222 | 4/1994 | Dion | 360/97.02 |
| 5,406,431 | 4/1995 | Beecroft | 360/97.02 |
| 5,477,401 | 12/1995 | Squires et al. | 360/75 |
| 5,539,595 | 7/1996 | Beck et al. | 360/97.01 |
| 5,590,001 | 12/1996 | Ino et al. | 360/97.02 |
| 5,602,700 | 2/1997 | Viskochil et al. | 360/105 |
| 5,754,365 | 5/1998 | Beck et al. | 360/97.02 |

FOREIGN PATENT DOCUMENTS

| 61-68792 | 4/1986 | Japan | 360/97.02 |
|---|---|---|---|
| 4-153975 | 5/1992 | Japan . | |
| 4-291082 | 10/1992 | Japan | 360/97.02 |
| 6-325563 | 11/1994 | Japan . | |

*Primary Examiner*—Jefferson Evans
*Attorney, Agent, or Firm*—Kinney & Lange

[57] ABSTRACT

A magnetic disc drive assembly comprises a disc drive housing defining a drive chamber. A desiccant housing in the drive chamber is joined to the bottom wall of the disc drive housing. The desiccant housing has end walls and side walls extending along a width and a length, respectively, of the desiccant housing, the length being oriented substantially parallel to the length of the drive chamber to form a structural beam for the disc drive housing. The desiccant housing has a top opening between the desiccant chamber and the drive chamber and a bottom opening through the bottom wall of the drive housing through which the desiccant is placed into the desiccant chamber. A separate bottom cover closes the bottom opening so that the desiccant may be place into the disc drive as the last assembly step.

14 Claims, 6 Drawing Sheets

DESICCANT HOUSING FOR A DISC DRIVE

CROSS-REFERENCE TO RELATED APPLICATION

This application claims priority from U.S. Provisional Application No. 60/057,955, filed Sept. 5, 1997 for "Ultra High Performance Disc Drive" by Kent J. Forbord and from U.S. Provisional Application No. 60/063,322, filed Oct. 27, 1997 for "Ultra High Performance Disc Drive" by Kent J. Forbord.

BACKGROUND OF THE INVENTION

This invention relates to magnetic disc drive assemblies of the class employing a stack of rigid discs in a standard housing profile.

Magnetic disc drive assemblies employing rigid, or hard, discs are commonly used in desktop and other computer mainframes as a principal memory for the computer. Currently, rigid disc magnetic disc drive assemblies are available in three different standard footprints, commonly known as 2 ½ inch, 3 ½ inch and 5 ¼ inch drives. Each of these standard drives are available in several configurations, the most common being known as low-profile and half-high drives. The principal difference between a low-profile drive and a half-high drive is that a low-profile drive typically has half the number of rigid discs in the disc stack, and hence half the data storage capacity, as a half-high drive. Computer manufacturers design their computer models to accommodate one of these three standard footprints and one of the two configurations. Consequently, disc drive manufacturers produce disc drives having a form and fit meeting the standard configuration of one of the three footprints and one of the two heights.

There is a continuing need for faster computers with greater capacity. One technique for meeting this need is described herein by decreasing the size of the recording discs without correspondingly decreasing the size of the housing. To maintain the same disc capacity, a greater number of discs is employed, resulting in a taller disc stack. To maintain the height of the disc drive within the standard configuration, it is necessary that the disc drive housing be thinner than prior housings and that the connections to external circuits be more compactly assembled to the disc drive housing. There is a need, however, for a mechanism to maintain the structural integrity of the disc drive housing without addition of new space-consuming components.

Most disc drives employ desiccants and desiccant housings to maintain the environment within the drive at a suitably low humidity. Since most disc drives are sealed from external environmental conditions, the desiccant serves to maintain the low humidity, regardless of the environmental conditions outside the drive. However, the desiccant packages have a life, dependent on the amount of moisture absorbed. Once the design maximum amount of moisture is absorbed, the desiccant package is no longer useful, and the disc drive is in risk of being subject to too much humidity which can adversely affect the performance of the drive.

One problem of the prior drives is that the desiccant package had to be inserted into the drive before writing servo tracks to the servo surface and before final testing of the drive. Only after completion of these operations could the drive be closed and sealed. During the servo writing and testing operations, the desiccant package was exposed to the high humidity of the surrounding environment, thereby adversely affecting the life of the desiccant package. There is a need, therefore for a desiccant housing within a disc drive that permits insertion of the desiccant package immediately before sealing the drive, thereby prolonging the life of the desiccant package to a maximum extent.

BRIEF SUMMARY OF THE INVENTION

The present invention is directed to a disc drive having a disc drive housing which has side walls and a bottom wall forming a drive chamber. The drive chamber contains at least one recording disc having a recording surface and an actuator assembly supporting a transducer adjacent the recording surface. The disc drive housing further having a top opening into the drive chamber to access the stack of recording discs and actuator assembly. A top cover closes the top opening of the drive chamber. A desiccant housing is in the drive chamber and is integral to the bottom wall of the disc drive housing. The desiccant housing has side walls forming a desiccant chamber for receiving a desiccant and a top opening between the desiccant chamber and the drive chamber when the top cover closes the top opening of the drive chamber. The length of the desiccant housing is oriented substantially parallel to the length of the drive chamber to provide structural support for the drive housing.

In one embodiment of the invention, the desiccant housing has a bottom opening through the bottom wall of the drive housing which provides access for placing desiccant in the desiccant chamber. A bottom cover closes the bottom opening of the desiccant chamber.

In another embodiment of the invention, the side walls of the desiccant housing form the top opening to the desiccant chamber on a plane that is sloped in relation to the bottom wall of the disc drive housing.

DETAILED DESCRIPTION OF THE PREFERRED EMBODIMENTS

Figure 1:
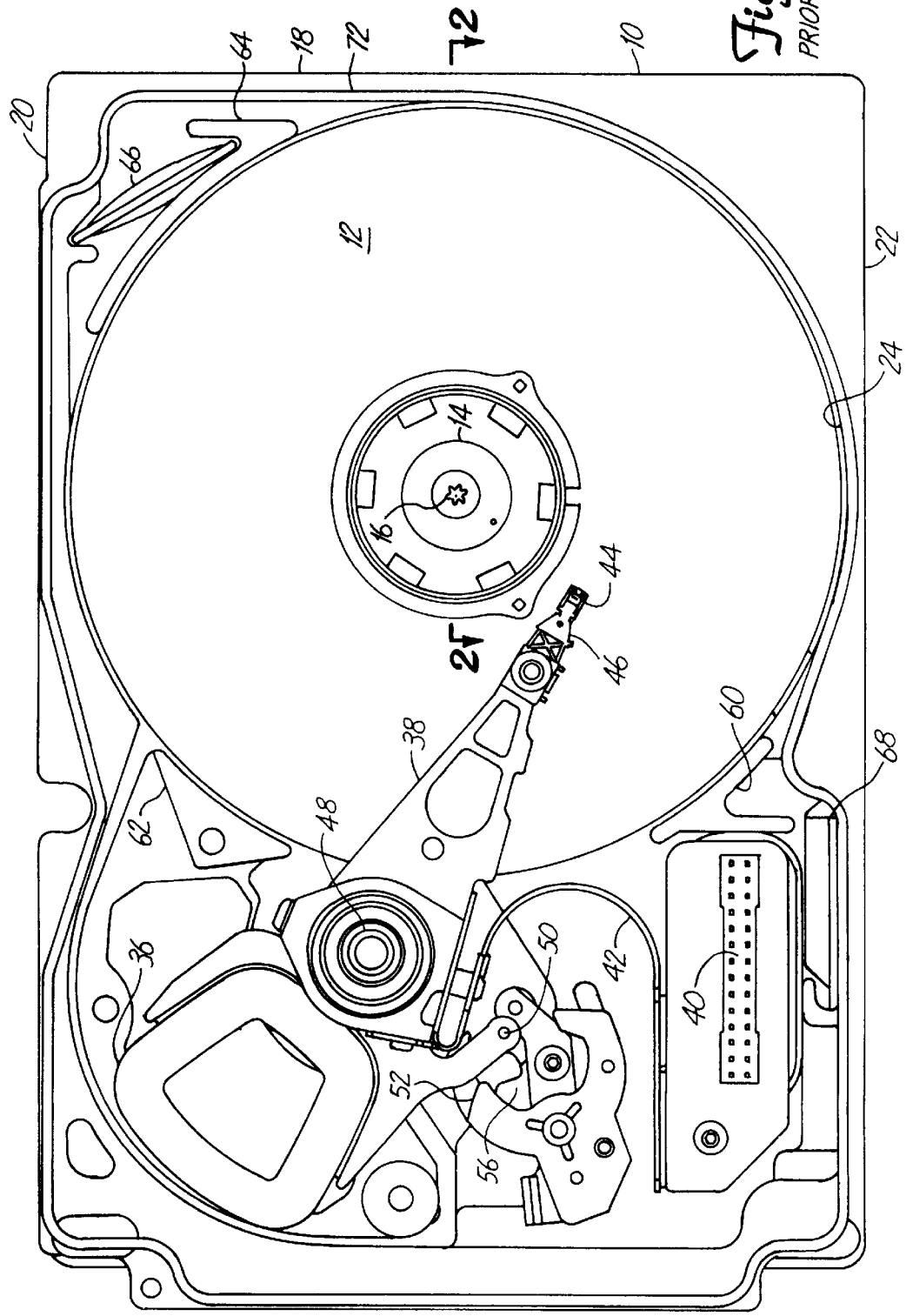
FIG. 1 is a top plan view of a standard magnetic disc drive, with the top cover removed, as in the prior art.
Figures 2, 4:
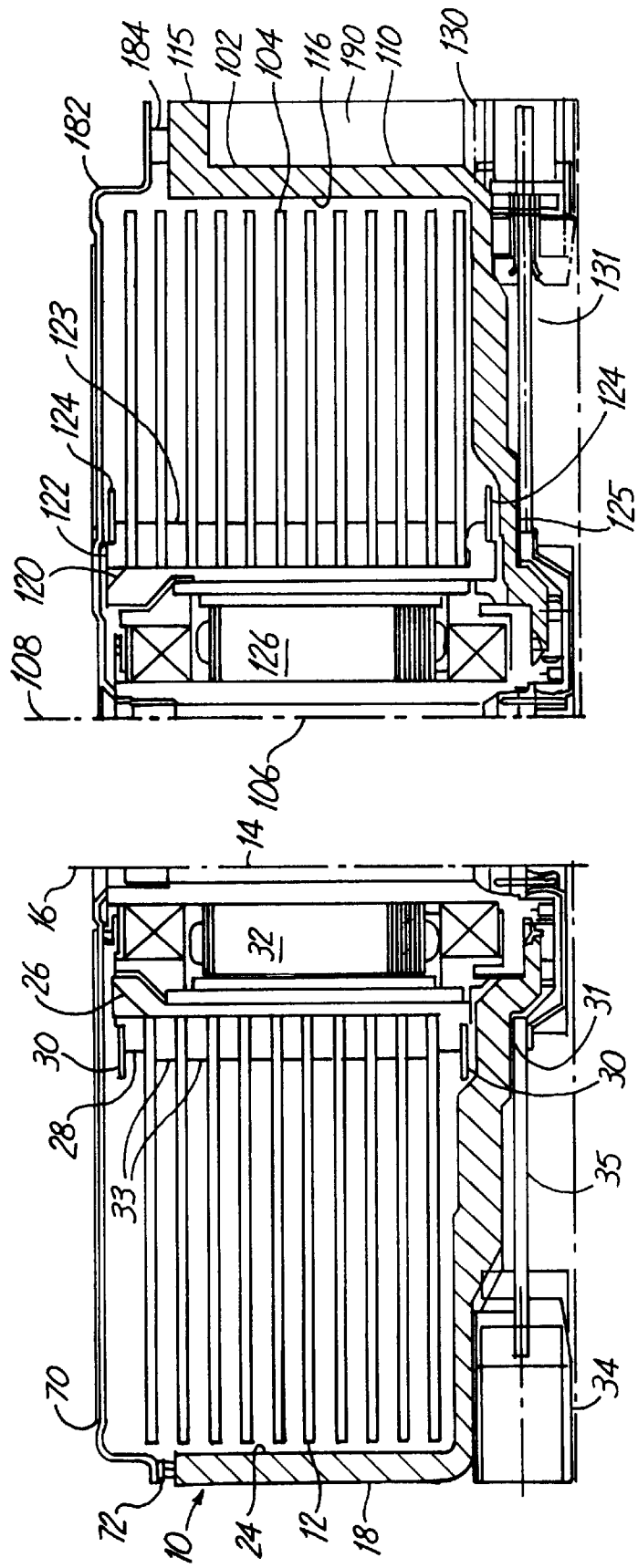
FIG. 2 is a partial section view of the disc stack and spindle assembly of the disc drive illustrated in FIG. 1, taken at line 2—2 in FIG. 1.
FIG. 4 is a partial section view of the disc stack and spindle assembly of the disc drive illustrated in FIG. 3, taken at line 4–4 in FIG. 3.

FIG. 1 is a top view, and FIG. 2 is a section view taken at line 2—2 in FIG. 1, of a standard 3 ½ inch half-high disc drive as in the prior art. The disc drive includes a housing 10 having a standard footprint that is 101.6 millimeters (4.0 inches) wide and 146 mm (5.75 inches) long. A stack of discs 12 are mounted to a disc spindle 14 centered on an axis 16 that is located 50.8 mm (2.0 inches) from one short side 18 and both long sides 20 and 22 of housing 10. Discs 12 have a diameter of 95 millimeters (3.74 inches) and are stacked on spindle 14 within a cylindrical receiver portion of housing 10 defined by inner cylindrical surface 24. Surface 24 has a radius of approximately 48.3 mm (1.9 inches), centered on axis 16. It will be appreciated that the thickness of the walls of housing 10 at the points where surface 24 is closest to the external sides 18, 20 and 22, is about 2.5 mm (0.1 inches).

As shown particularly in FIG. 2, the stack of discs comprises ten concentric discs 12 mounted to an aluminum hub 26 by clamp ring 28. Balance shims 30 positioned on the clamp ring and the lower portion of hub 26 provide balance to the stack of discs to prevent wobble as the discs spin. Each disc has a thickness of approximately 0.8 mm (0.0315 inch) and spacers 33 space the discs from each other by approximately 1.84 mm (0.0725 inch). As shown, spacers 33 extend radially from spindle axis 16 by a design width greater than the radial width of clamp ring 28. The radial extent of spacers 33 define the position of the innermost track on discs 12. The radius of the clamp ring is smaller than the radius of the spacers. The stack height of a full stack of ten discs (between the top surface of the top disc and the bottom surface of the bottom disc) is approximately 24.6 mm (0.9675 inch). Motor 32 is mounted to spindle 14 to rotate discs 12 at a design speed of 7200 revolutions per minutes (rpm). The disc drive illustrated in FIGS. 1 and 2 has a track density of 8250 tracks per radial inch (325 tracks per radial millimeter) of each disc. With ten discs as described, the disc drive of the prior art has a data capacity of about 18 gigabytes.

Input/output cable connector 34 is a female connector that mates with a corresponding standard male connector (not shown) connected to external circuitry (not shown). Connector 34 is connected to circuit board 35 that nests beneath the disc drive at an underportion of housing 10. Due to its configuration, connector 34 requires more space adjacent side 18 of the housing than board 35 requires more centrally. Connector 34 and circuit board 35 provide power and control inputs for motor 32 as well as signal and power inputs and outputs for other portions of the disc drive to be described. Circuit board 35 may also include data processing circuits used in reading and writing data from and to the recording surfaces on the discs. Typically, additional printed circuits (not shown) are formed in housing 10 on a bottom surface for distribution of signals to voice coil motor 36 (FIG. 1) for E-block 38, as well as to bulkhead connector 40. Bulkhead connector 40 is connected to flex circuit 42, which in turn spans the space and is connected to conductors on E-block 38. The conductors on the E-block extend to magnetic transducing heads on sliders 44, one slider being mounted to each load arm 46 at the end of the actuator arms of E-block 38. Load arms 46 support gimbal suspensions that support head/slider devices. Slider 44 "flies" over the respective disc surface on an air bearing created by rotation of the disc.

As is well known in the art, there is a separate load arm 46 and gimbal/slider/head 44 for each of the twenty disc surfaces of the ten discs 12. The twenty load arms 46 are mounted to eleven actuator arms of the E-block for rotation about axis 48 under the influence of voice coil motor 36. A latch pin 50 is mounted to arm 52 of E-block 38 to react against stop surfaces (not shown) rigidly mounted to the lower wall or deck of housing 10 to limit the rotational travel of the E-block to thereby define the inner and outer tracks on discs 12. The engagement of latch pin 50 to a stop surface limits the rotational travel of E-block 38 about the axis 48 of the actuator arm, thereby defining stop positions for the stop arm that in turn define the inner and outer tracks of the discs. In the prior art 3 ½ inch disc drive, the inner data track radius is 20.4 mm (0.804 inches) and the outer data track radius is 45.7 mm (1.8 inches) from spindle axis 16 of discs 12.

Conveniently, a latch mechanism 56 is mounted to housing 10 to engage E-block 38 when the actuator assembly is in a rest or shipping position at an inner track of discs 12. Latch mechanism 56 is mounted to the bottom wall of housing 10 in the space adjacent flex cable 42. It will be appreciated that flex cable 42 requires a volume of space (real estate) to fold or bend within the housing as E-block 38 rotates to position the heads at selected radial positions relative to the discs. Desiccant package 68 is positioned between bulkhead connector 40 and side wall 22 of housing 10.

A stainless steel cover 70 (FIG. 2) is fastened to the top surface of housing 10 with a gasket 72 to thereby seal the contents of the housing and protect the disc drive from contaminants that might otherwise enter the drive. Conveniently, a desiccant packet 68 is inserted into the disc drive prior to final assembly of flex cable 42 and cover 70 to housing 10 to maintain the humidity within the disc drive to a design level. With the cover in place, the overall height of the disc drive is 41.15 mm (1.62 inches).

It will be appreciated that the space within housing 10 of the disc drive illustrated in FIGS. 1 and 2 is occupied with the various parts of the disc drive. Real estate is at a premium, restricting optimal layout of additional electronics or mechanical features to improve the disc drive performance.

It will also be appreciated that the outer edges of the discs are moving at a linear rate of approximately 1,615 inches per second (ips) (63.58 mm/s). The relative movement of the disc to the transducer slider creates an air bearing on which the slider flies. However, the rotating disc also pumps air into and out of the space between the discs, creating a turbulent air flow pattern in that space. This turbulence creates varying air velocities and pressures within the disc drive which excite the disc assembly into resonance. Resonance within the disc assembly creates mechanical movements, resulting in transducer or head positioning errors which can adversely affect the performance of the disc drive or adversely limit track density. Baffles 60, 62, and 64 are often employed about the outer periphery of the discs to channel air movement and reduce air turbulence within the disc drive, thereby reducing drag on the discs and the power required to rotate the discs. Conveniently, filter 66 may be employed to filter contaminants from the air.

A "low-profile" version of the disc drive illustrated in FIG. 1 and 2 comprises a disc drive with five discs (instead of ten in a half-high drive) so that the stack height is 11.37 mm (0.4475 inches), instead of 24.6 mm in a half-high drive, and the overall or profile height with the cover in place is 25.4 mm (1.00 inches), instead of 41.15 mm in a half-high drive. Also, since there are only five discs, ten load arms mounted to six actuator arms of the E-block are employed, instead of twenty and eleven in the case of the half-high drive. Otherwise, the construction is the same. The low-profile and half-high drives enjoy the same footprint, and the same size and style of recording discs, and essentially the same seek time. However, because there are half as many discs in a low-profile drive, the total data capacity is also half that of a half-high drive. Hence, the low-profile drive has a capacity of about 9 gigabytes, compared to 18 gigabytes of the half-high drive.

There are several problems with the disc drive illustrated in FIGS. 1 and 2. Due to the volume requirements of the various components of the drive, there is no real estate available for future electronic or mechanical features to improve the disc drive. Moreover, the drive is limited in access time and speed of recovery. More particularly, the actuator assembly illustrated in FIG. 1 has a length of 52 mm (2.05 inches) from axis of 48 to the transducing gap of head 44. The actuator arm illustrated in FIG. 1 typically requires an inertia of 116 gram-cm$^2$ (18 gram-inch$^2$). Track seeks, which is the movement of the head from a current track to a desired destination track, requires an average of 7.7 milliseconds (msec). Moreover, once reaching the destination track, there is a latency associated with the disc drive because the disc must rotate to a position where the head may read a header or other informational portion of the track before the head is readied for transducing with the track. During the seek movement and latency, it is not possible to read data from, or write data to, the disc tracks. The present invention is directed to an improved disc drive requiring less inertia for the actuator arm and a shorter average seek time without sacrificing drive capacity or the form factor of the disc housing, or significantly increasing power requirements of the spindle motor.

Figure 3:
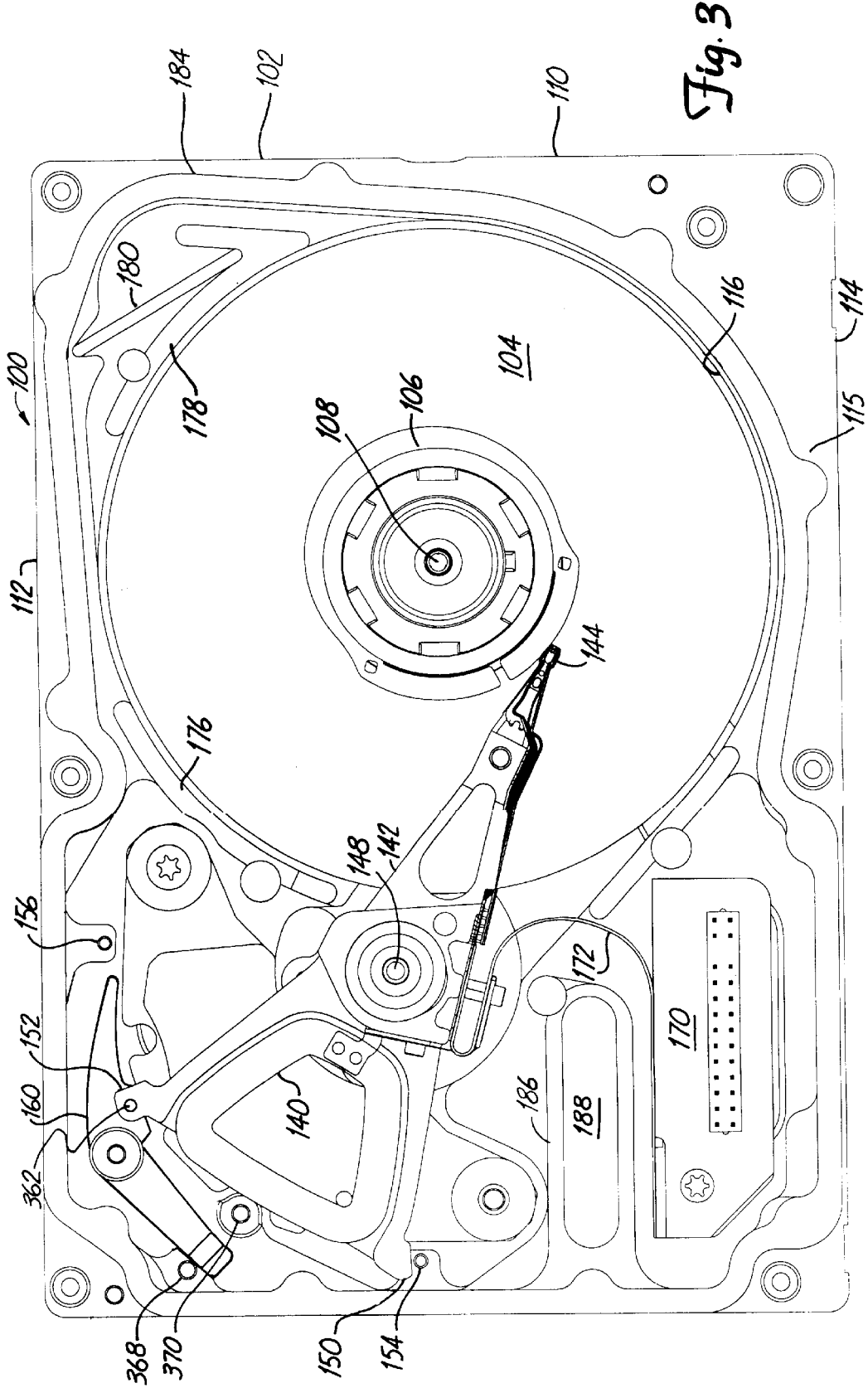
FIG. 3 is a top plan view of a magnetic disc drive, with the top cover removed, in accordance with the present invention.
Figure 5:
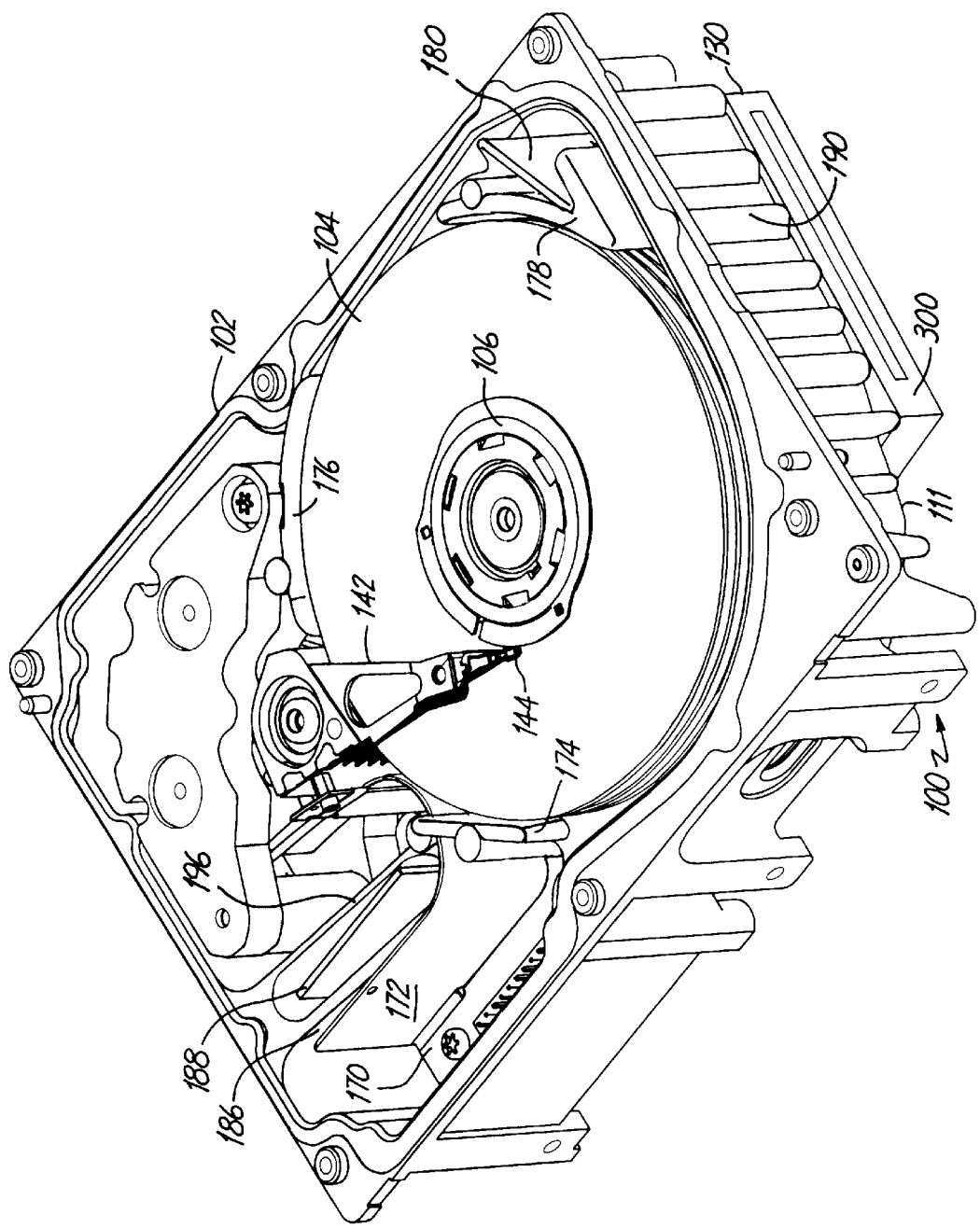
FIG. 5 is a frontal and top perspective view of the disc drive illustrated in FIGS. 3 and 4, with the top cover removed.
Figure 6:
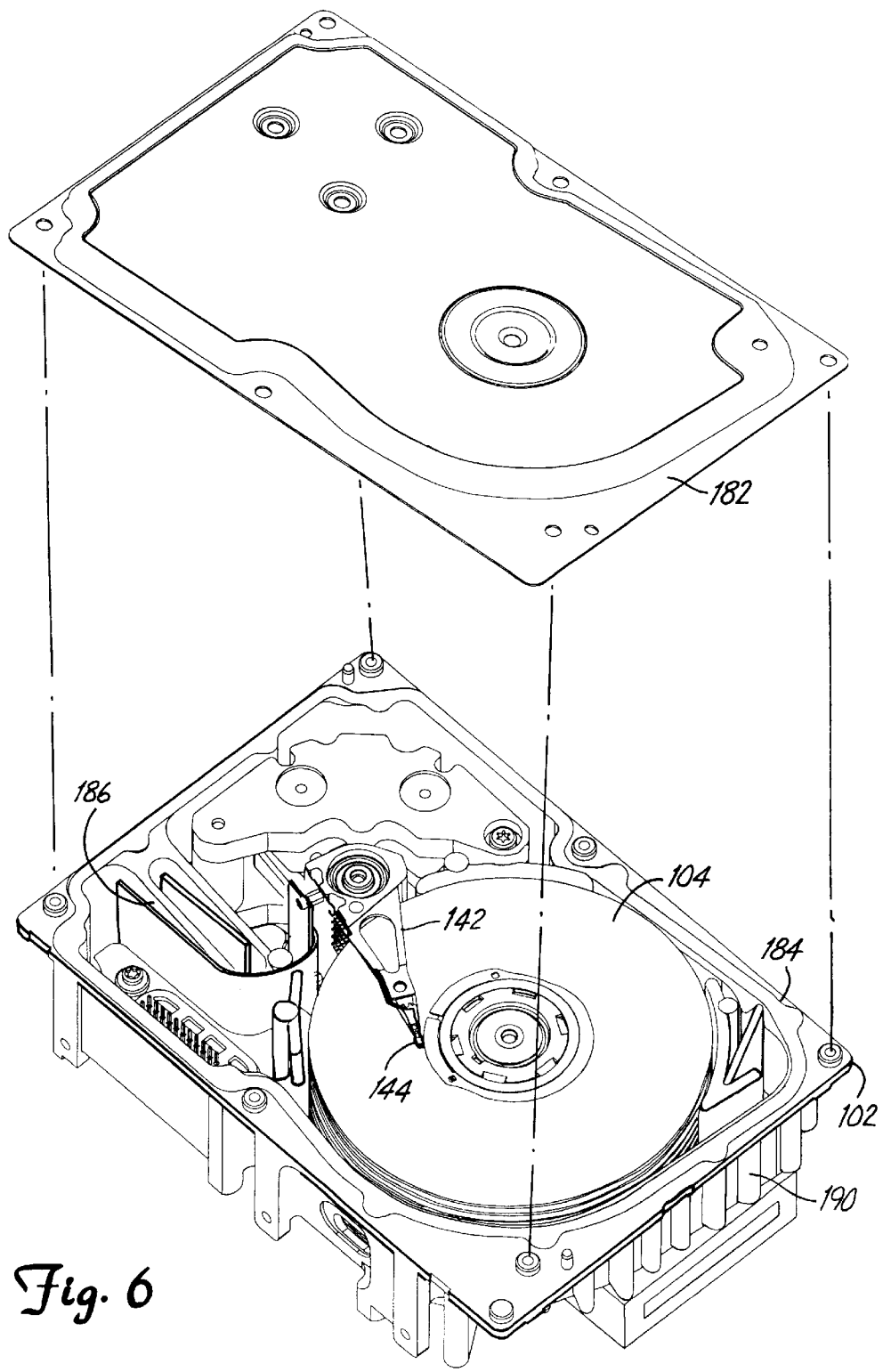
FIG. 6 is an exploded perspective view, as in FIG. 5, of the disc drive illustrated in FIGS. 3 and 4 and its top cover.
Figure 7:
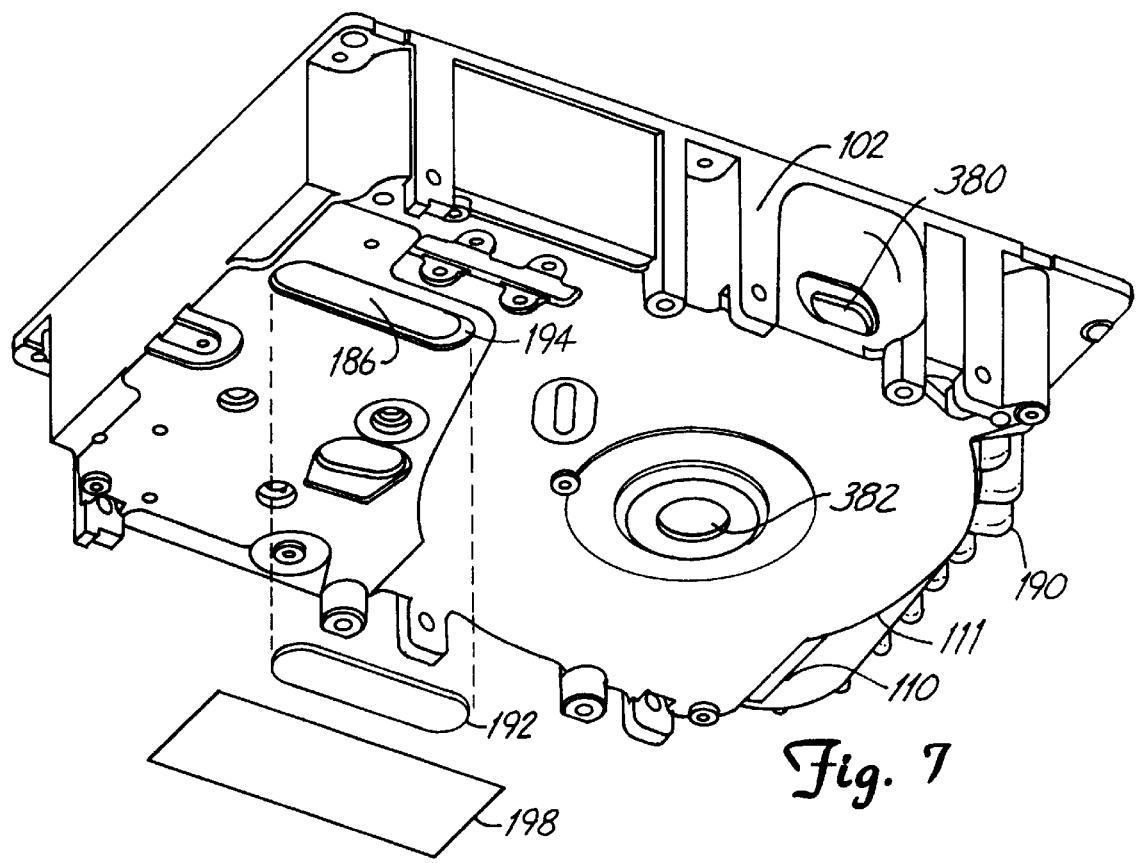
FIG. 7 is a perspective bottom view of the disc drive housing illustrated in FIGS. 3 and 4 illustrating the assembly of the bottom seal to the housing.
Figure 8:
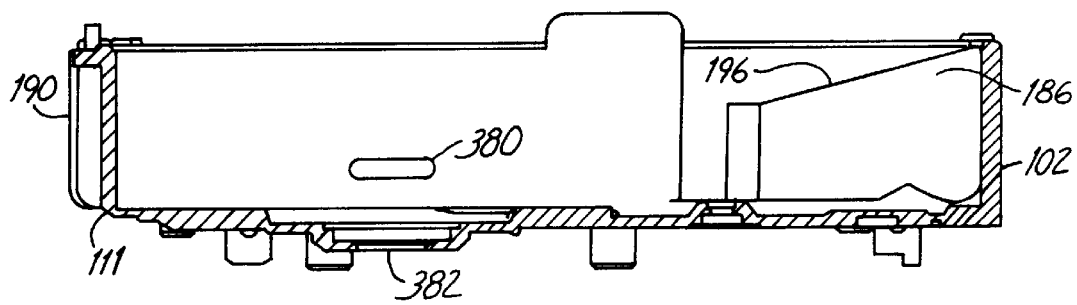
FIG. 8 is a section view of the disc drive housing taken at line 8—8 in FIG. 3.

FIGS. 3 and 4 illustrate a top view and section view of a disc drive 100 in accordance with one embodiment of the present invention. FIG. 5 is a perspective view of disc drive 100, FIG. 6 is an exploded top perspective view of disc drive 100, FIG. 7 is an exploded bottom perspective view of the disc drive housing for disc drive 100, and FIG. 8 is a section view of the disc drive housing taken at line 8—8 in FIG. 3. For sake of comparison, the disc drive illustrated in FIGS. 3, 4 and 5–8 will be described in comparison to the 3 ½ inch half-high standard disc drive illustrated in FIGS. 1 and 2, but it is understood that the principles of the present invention are applicable to other standard disc drive forms, including 2 ½ inch and 5 ¼ inch drive forms and other heights, including low-profile.

Disc drive 100 includes a housing 102 having a standard footprint that is 101.6 mm (4.0 inches wide) and 146 mm (5.75 inches) long and identical to the footprint of the disc drive illustrated in FIGS. 1 and 2. A stack of twelve discs 104 are mounted to a disc spindle 106 centered on an axis 108 that is located 50.8 mm (2.0 inches) from one short side 110 and both long sides 112 and 114 of housing 102. Discs 104 have a diameter of 84 millimeters (about 3.3 inches) and are stacked on spindle 106 within a cylindrical receiver portion of housing 102 defined by inner cylindrical surface 116. Surface 116 has a radius of approximately 43.2 mm (1.7 inches), centered on axis 108. It will be appreciated that walls 110, 112 and 114 form a lip 115 at the top of housing 102, and that the thinnest portion of lip 115 (where surface 116 is closest to the external sides 110, 112 and 114), is about 7.6 mm (0.3 inches), as compared to 2.5 mm in the drive illustrated in FIGS. 1 and 2. Moreover, wall 110 includes heat fins 190 (FIG. 5), and the bottom edge of wall 110 includes a curved outline following the curve of the discs.

As shown particularly in FIG. 4, the stack of discs comprises twelve concentric discs 104 mounted to an aluminum hub 120 by clamp ring 122. Balance shims 124 positioned on clamp ring 122 and the lower portion of hub 120 provide balance to the stack of discs to prevent wobble as the discs spin. Each disc 104 has a thickness of approximately 0.8 mm (0.0315 inch) and spacers 123 between the discs space the discs from each other by approximately 1.75 mm (0.069 inch). Consequently, the stack height of a full stack of twelve discs is approximately 28.88 mm (1.137 inch). Motor 126 is mounted to spindle 106 to rotate discs 104 at a design speed of 10,000 rpm.

Input/output connector 130 connects external circuitry (not shown) to circuit board 131 mounted under the underportion of housing 102. Like connector 34 shown in FIG. 2, connector 130 requires more space at the edges of the housing than board 131 requires centrally. Connector 130 does not interfere with the space required for discs 104. As in the prior art, connector 130 provides power and control inputs for motor 126 as well as signal and power inputs and outputs for other portions of the disc drive to be described.

As shown particularly in FIG. 4, the thickness of the bottom wall 125 of housing 102 is thinner than that of prior art housing 10. More particularly, the thickness of the bottom wall 125 is about 3.25 mm (0.124 inches), compared to about 3.81 mm (0.150 inches) at bottom wall 31 in housing 10. Surface 116 forms a reduced receiver portion within housing 102 to receive the smaller discs. This reduced receiver portion offsets any reduction in axial stiffness of housing 102 due to the reduced thickness of wall 125. Additionally, the thicker walls 110, 112 and 114 as described above, and the structural support provided by desiccant housing 186 described below, provide additional structural support for housing 102.

Also as shown in FIG. 4, clamp ring 122 is axially thinner, but radially wider, than clamp ring 28 shown in FIG. 4. More particularly, the radial width of clamp ring 122 is approximately equal to the radial width of spacers 123 to compensate for the smaller axial thickness of the clamp ring to thereby control hoop stress in the clamp ring. The radial extent of spacers 123 define the position of the innermost track on discs 104. The reduced thickness of wall 125 (compared to wall 31), thinner clamp ring 122 (compared to clamp ring 28), thinner spacers 123 (compared to spacers 33) and closer positioning of the disc stack to the lower wall of the housing permit the twelve discs of disc drive 100 to fit into the same vertical dimension as the ten discs of the disc drive according to the prior art. Hence, the disc drive shown in FIG. 4 has a height of 41.15 mm (1.62 inches), the same as the disc drive shown in FIG. 2. The structural integrity of clamp ring 122 is not affected because its extended radial width offsets its thinner axial thickness. Moreover, the position of the innermost radial track on the recording disc is not affected by the wider clamp ring because the clamp ring extends no further from spindle axis 108 than do spacers 123.

Printed circuits (not shown) are formed in housing 102 on a bottom surface to provide connection to voice coil motor 140 (FIG. 3) for E-block 142, as well as data paths to bulkhead connector 170 mounted to the bottom wall of housing 102. Flex circuit 172 is connected to connector 170 and to conductors 214 (FIG. 13) on E-block 142 to provide signals to heads 144 mounted to each load arm 146 at the end of the actuator arms of E-block 142. Flex circuit 172 also carries voice coil signals for motor 140.

The disc drive illustrated in FIGS. 3 and 4 has a track density of 9000 tracks per radial inch (354.3 tracks per radial mm) of each disc. With twelve discs as described, the disc drive illustrated in FIGS. 3 and 4 has a data capacity of about 18 gigabytes.

Baffles 174, 176 and 178 are employed about the outer periphery of the discs to channel air movement and reduce drag on the discs. Filter 180 may be employed to filter contaminants from the air. An aperture 380 (FIGS. 7 and 8) is provided in a wall of housing 102 to permit the clock write head to access the servo track of the disc drive, and bottom aperture 382 (FIGS. 7 and 8) provides a seat for disc spindle 106 and its associated bearings; aperture 382 being sealed by a gasket and insertion of the disc spindle to the housing.

A stainless steel cover 182 (FIGS. 4 and 6) is fastened to the top surface of housing 102 with a gasket 184 to seal the chamber of the housing and protect the disc drive from contaminants that might otherwise enter the drive. The top cover is fastened to housing 102 by threaded fasteners (not shown). A bottom cover 192 (FIG. 7) is fastened to the bottom wall of housing 102 to close a desiccant chamber. Bottom cover 192 comprises a metal plate assembled into the opening 194 in the bottom wall and held in place and sealed by adhesive tape 198. With the covers in place, the overall height of the disc drive is 41.15 mm (1.62 inches).

In the prior art, the desiccant member 68 (FIG. 1) was positioned in housing 10 between bulkhead connector 40 and the inside surface of side wall 22. It was necessary to insert the desiccant package 68 and prior to sealing the drive. The desiccant package was then exposed to the relatively humid ambient conditions for a considerable amount of time during servo track writing and other testing before closing and sealing the drive. The present invention employs a desiccant housing 186 that permits placement of desiccant 188 into the housing immediately before closing and sealing the disc drive, so the desiccant is exposed to humid air outside the drive for a minimal period of time.

FIG. 7 is an exploded bottom view of the disc drive housing 102 and bottom cover 192, and FIG. 8 is a section view of the housing 102 (without covers) taken at line 8—8 in FIG. 3. As shown in FIG. 7, a desiccant housing 186 is integral with the bottom wall of housing 102. Desiccant housing 186 has side walls that define a length and width to a desiccant chamber containing desiccant pack 188. One of the width side walls of desiccant housing 186 is common to one of the width side walls of disc drive housing 102 so that the desiccant housing is oriented lengthwise within the disc drive housing with the walls defining the length of the desiccant housing being substantially parallel to the walls defining the length of housing 102. Desiccant housing 186, being integral with the bottom wall of housing 102, forms a structural beam for the bottom wall of housing 102 to provide additional structural strength for the housing. Desiccant housing 186 forms an opening 194 in the bottom wall of housing 102 and is closed and sealed by bottom cover 192, assembled into opening 194 and held in place and sealed with flexible adhesive tape. Desiccant pack 188 is inserted into the housing 186 immediately prior to fastening the bottom cover 192 to the housing to maintain the humidity within the disc drive to a design level. As shown in FIG. 8, the top edge 196 of desiccant housing 186 is in a plane that is sloped from the common wall with housing 102 and downwardly toward the bottom wall or deck of housing 102 to form a sloped opening between the desiccant chamber within housing 186 and the disc drive components in the chamber enclosed within housing 102 and the top and bottom covers. The sloped opening permits good air circulation between the disc drive chamber and the desiccant in housing 186 to maintain the humidity within the disc drive chamber at a design level. Conveniently, the angle of the plane of sloped opening 196 is between about 20° and 25° from the plane of the bottom surface.

During assembly, the components of the disc drive are assembled by access into the disc drive chamber through the top opening of housing 102. Upon completion of the assembly, the top cover is attached and sealed to disc drive housing 102. Desiccant pack 188 is then placed within housing 186 which is then closed and sealed with bottom cover 192 and flexible tape, as described above. Since the desiccant is exposed to the atmosphere for a minimal period of time during final assembly, damage to the desiccant due to atmospheric conditions is minimized. As a result, the desiccant is able to immediately adjust the enclosed atmosphere of the disc drive chamber to the design humidity.

As described above, the bottom wall of housing is thinner than in the prior art drive. The thinner housing walls are adequate because of the smaller opening required for the discs. Moreover, the orientation of desiccant housing 186 along the long dimension of housing 102 more centrally from the side walls permits the desiccant housing to form a strengthening member for the housing. The orientation of desiccant housing 186 longitudinally within the disc drive housing provides structural support for the disc drive housing and overcomes any structural loss due to the thinner housing walls. The 20° and 25° angle to the slope of the top of desiccant housing 186 does not detract from the strengthening effect to housing 102 provided by the desiccant housing.

A "low-profile" version of the disc drive illustrated in FIG. 3 and 4 comprises a disc drive with six discs (instead of twelve in a half-high drive) so that the stack height is 13.56 mm (0.534 inches), instead of 11.37 mm stack height of low-profile drives of the prior art and 28.88 mm stack height of half-high drives according to the present invention. The overall or profile height of the low-profile disc drive of the present invention, with the cover in place, is 25.4 mm (1.00 inches), instead of 41.15 mm in a half-high drive, and is the same as in the prior art lowprofile drive of FIGS. 1 and 2. As in the prior art, the low-profile and half-high versions of the drives according to the present invention enjoy the same foot print, size and style of recording discs and essentially the same actuator arm seek times. However, because there are half as many discs in a low-profile drive, the total data capacity is also half that of a half-high drive. Hence, the low-profile drive has a capacity of about 9 gigabytes, compared to 18 gigabytes of the half-high drive.

Although the present invention has been described with reference to preferred embodiments, workers skilled in the art will recognize that changes may be made in form and detail without departing from the spirit and scope of the invention.

We claim:

1. A disc drive having
   a disc drive housing having side walls, end walls and a bottom wall forming a drive chamber, the side walls of the disc drive housing extending along a length of the drive chamber and the end walls of the disc drive housing extending along a width of the drive chamber, the end walls and side walls being joined to the bottom wall and the length of the drive chamber being longer than the width of the drive chamber, the drive chamber containing at least one recording disc having a recording surface and an actuator assembly supporting a transducer adjacent the recording surface, the disc drive housing further having a top opening into the drive chamber to access the recording disc and actuator assembly;

a top cover closing the top opening of the drive chamber; and a desiccant housing in the drive chamber, the desiccant housing having side walls and end walls joined to the bottom wall of the disc drive housing to form a desiccant chamber in the drive chamber for receiving a desiccant, the side walls of the desiccant housing extending along a length parallel to the length of the drive chamber and the end walls of the desiccant housing extending along a width, the length of the desiccant housing being longer than the width of the desiccant housing, the desiccant housing having a top opening between the desiccant chamber and the drive chamber when the top cover closes the top opening of the drive chamber, the top opening to the desiccant chamber forming a plane that is sloped in relation to the bottom wall of the disc drive housing.

2. The disc drive of claim 1, wherein the disc chamber contains a stack of a plurality of recording discs, each recording disc having two recording surfaces, and the actuator assembly supports a transducer adjacent each recording surface.

3. The disc drive of claim 1, wherein the desiccant housing is positioned within the disc drive housing so that the side walls of the desiccant housing are spaced from the side walls of the disc drive housing.

4. The disc drive of claim 1, wherein the desiccant housing forms a structural beam for the bottom wall of the disc drive housing.

5. A disc drive having
a disc drive housing having side walls, end walls and a bottom wall forming a drive chamber, the side walls of the disc drive housing extending along a length of the drive chamber and the end walls of the disc drive housing extending along a width of the drive chamber, the end walls and side walls being joined to the bottom wall and the length of the drive chamber being longer than the width of the drive chamber, the drive chamber containing at least one recording disc having a recording surface and an actuator assembly supporting a transducer adjacent the recording surface, the disc drive housing further having a top opening into the drive chamber to access the recording disc and actuator assembly;
a top cover closing the top opening of the drive chamber; and
a desiccant housing in the drive chamber, the desiccant housing having side walls and end walls joined to the bottom wall of the disc drive housing to form a desiccant chamber in the drive chamber for receiving a desiccant, the side walls of the desiccant housing extending along a length parallel to the length of the drive chamber to form a structural beam for the bottom wall of the disc drive housing, and the end walls of the desiccant housing extending along a width, at least one end wall of the desiccant housing being common with one end wall of the disc drive housing, the length of the desiccant housing being longer than the width of the desiccant housing, the desiccant housing having a top opening between the desiccant chamber and the drive chamber when the top cover closes the top opening of the drive chamber.

6. The disc drive of claim 5, wherein the side wall of the desiccant housing form the top opening of the desiccant chamber in a plane that is sloped from the common side wall toward the bottom wall of the disc drive housing.

7. The disc drive of claim 5, wherein the desiccant housing is positioned within the disc drive housing so that the side walls of the desiccant housing are spaced from the side walls of the disc drive housing.

8. The disc drive of claim 7, wherein the side walls of the desiccant housing form the top opening of the desiccant chamber in a plane that is sloped from the common side wall toward the bottom wall of the disc drive housing.

9. A disc drive having
a disc drive housing having side walls, end walls and a bottom wall forming a drive chamber, the side walls of the disc drive housing extending along a length of the drive chamber and the end walls of the disc drive housing extending along a width of the drive chamber, the end walls and side walls being joined to the bottom wall and the length of the drive chamber being longer than the width of the drive chamber, the drive chamber containing at least one recording disc having a recording surface and an actuator assembly supporting a transducer adjacent the recording surface, the disc drive housing further having a top opening into the drive chamber to access the recording disc and actuator assembly;
a top cover closing the top opening of the drive chamber; and
a desiccant housing in the drive chamber, the desiccant housing having side walls and end walls joined to the bottom wall of the disc drive housing to form a desiccant chamber in the drive chamber for receiving a desiccant, the side walls of the desiccant housing extending along a length parallel to the length of the drive chamber and the end walls of the desiccant housing extending along a width, the length of the desiccant housing being longer than the width of the desiccant housing, the desiccant housing having a top opening between the desiccant chamber and the drive chamber when the top cover closes the top opening of the drive chamber, a bottom opening through the bottom wall of the disc drive housing to the desiccant chamber, the bottom opening providing access for placing desiccant in the desiccant chamber, and a bottom cover closing the bottom opening of the desiccant chamber.

10. The disc drive of claim 9, wherein one end wall of the desiccant housing is common with one end wall of the disc drive housing.

11. The disc drive of claim 10, wherein the desiccant housing is positioned within the disc drive housing so that the side walls of the desiccant housing are spaced from the side walls of the disc drive housing.

12. The disc drive of claim 11, wherein the desiccant housing forms a structural beam for the bottom wall of the disc driving housing.

13. The disc drive of claim 12, wherein the side walls of the desiccant housing form the top opening of the desiccant chamber in a plane that is sloped from the common side wall toward the bottom wall of the disc drive housing.

14. The disc drive of claim 9, wherein the side walls of the desiccant housing form the top opening of the desiccant chamber in a plane that is sloped from the common side wall toward the bottom wall of the disc drive housing.

* * * * *